US010833941B2

(12) United States Patent
Tofighbakhsh et al.

(10) Patent No.: US 10,833,941 B2
(45) Date of Patent: *Nov. 10, 2020

(54) CONTROLLING NETWORK TRAFFIC USING ACCELERATION POLICIES

(71) Applicant: AT&T Intellectual Property I, L.P., Atlanta, GA (US)

(72) Inventors: Mostafa Tofighbakhsh, Cupertino, CA (US); Cagatay Buyukkoc, Holmdel, NJ (US); Paul Gausman, Bridgewater, NJ (US); Shyam Parekh, Orinda, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/042,036

(22) Filed: Jul. 23, 2018

(65) Prior Publication Data

US 2018/0331910 A1    Nov. 15, 2018

Related U.S. Application Data

(63) Continuation of application No. 13/672,743, filed on Nov. 9, 2012, now Pat. No. 10,033,587.

(51) Int. Cl.
*H04L 12/24* (2006.01)
*H04L 12/815* (2013.01)
(Continued)

(52) U.S. Cl.
CPC ......... *H04L 41/0893* (2013.01); *H04L 47/22* (2013.01); *H04L 47/25* (2013.01); *H04L 41/145* (2013.01); *H04L 51/18* (2013.01)

(58) Field of Classification Search
CPC ..... H04L 41/0893; H04L 47/25; H04L 47/22; H04L 51/18; H04L 41/145
See application file for complete search history.

(56) References Cited

U.S. PATENT DOCUMENTS 6,343,085 B1    1/2002    Krishnan
6,510,469 B1    1/2003    Starnes
(Continued)

OTHER PUBLICATIONS

Jodyb, "Data Speed Reduction" Oct. 14, 2011, https://web.archive.org/web/20111021062726/https://support.t-mobile.com/docs/D)C-2741 (Year: 2011).*

(Continued)

*Primary Examiner* — John A Follansbee
*Assistant Examiner* — Lam T Do
(74) *Attorney, Agent, or Firm* — Hartman & Citrin LLC

(57) ABSTRACT

Concepts and technologies are disclosed herein for controlling network traffic using acceleration policies. According to various embodiments of the concepts and technologies disclosed herein, an acceleration application can be executed by a device for analyzing data requests, determining if the data communications requested by way of the request can be delayed, accelerated, or otherwise modified ("shifted") based upon policies and/or network operating conditions. In some embodiments, the acceleration application can be configured to access acceleration policies that can define how certain traffic is to be shifted. The acceleration application also can be configured to obtain and analyze network data to determine network operating conditions and determine, based upon the determined conditions, if traffic is to be shifted based upon the network operating conditions.

20 Claims, 8 Drawing Sheets

(51) Int. Cl.
*H04L 12/825* (2013.01)
*H04L 12/58* (2006.01)

(56) References Cited

U.S. PATENT DOCUMENTS

| | | | |
|---|---|---|---|
| 6,654,786 | B1 | 11/2003 | Fox |
| 6,785,873 | B1 | 8/2004 | Tseng |
| 6,865,185 | B1 | 3/2005 | Patel et al. |
| 7,698,432 | B2 | 4/2010 | Short et al. |
| 7,716,332 | B1 | 5/2010 | Topfl |
| 7,765,294 | B2 | 7/2010 | Edwards et al. |
| 8,245,234 | B2 | 8/2012 | Krishnakumar |
| 8,737,221 | B1 | 5/2014 | Jilani et al. |
| 8,904,042 | B1 | 12/2014 | Dellecave, Jr. |
| 9,052,831 | B1 | 6/2015 | Stefani |
| 2002/0138643 | A1 | 9/2002 | Shin |
| 2003/0043777 | A1 | 3/2003 | Koponen et al. |
| 2003/0046383 | A1 | 3/2003 | Lee |
| 2004/0010585 | A1 | 1/2004 | Jones, Jr. |
| 2004/0236846 | A1 | 11/2004 | Alvarez |
| 2005/0083973 | A1* | 4/2005 | Krishnan ............ H04J 3/1682 370/468 |
| 2005/0147035 | A1 | 7/2005 | Sylvain |
| 2006/0233100 | A1 | 10/2006 | Luft |
| 2007/0167174 | A1 | 7/2007 | Halcrow |
| 2007/0183416 | A1 | 8/2007 | Gooch |
| 2007/0297348 | A1 | 12/2007 | Trac |
| 2008/0049632 | A1 | 2/2008 | Ray |
| 2008/0089237 | A1 | 4/2008 | Molen |
| 2009/0109849 | A1 | 4/2009 | Wood et al. |
| 2010/0188976 | A1 | 7/2010 | Rahman |
| 2011/0238858 | A1 | 9/2011 | Sagara |
| 2011/0320592 | A1 | 12/2011 | Kemmerer, Jr. |
| 2012/0106342 | A1 | 5/2012 | Sundararajan |
| 2012/0157038 | A1 | 6/2012 | Menezes |
| 2012/0164968 | A1 | 6/2012 | Velusamy |
| 2012/0263036 | A1 | 10/2012 | Barclay |
| 2013/0077486 | A1 | 3/2013 | Keith |
| 2013/0094356 | A1 | 4/2013 | Keith et al. |
| 2013/0189947 | A1 | 7/2013 | Kovacs |
| 2013/0205002 | A1 | 8/2013 | Wang et al. |
| 2013/0246508 | A1 | 9/2013 | McCanne et al. |
| 2014/0258366 | A1 | 9/2014 | L'Heureux |

OTHER PUBLICATIONS

Jodyb, "Data Speed Reduction" Oct. 14, 2011, https://web.archive.org/web/20111021062726/https://support.t-mobile.com/docs/DOC-2741.

Ou, George, "Comments of the Information Technology and Innovation Foundation," Jul. 4, 2010, https://web.archive.org/web/20100704114103/http://www.itif.org/files/networkmanagementschemes.pdf.

Beren, David, "T-Mobile Will Introduce New 'Unlimited' Data Plan That's Actually Unlimited," Aug. 21, 2012, http://www.tmonews.com/2012/08/t-mobile-will-introduce-new-unlimited-data-plan-thats-actually-unlimited/.

Dampier, Phillip, "MetroPCS' Nasty Terms of Use: 'We May Not Provide You a Meaningful Data Experience,'" May 25, 2011, http://stopthecap.com/2011/05/25/metropcs-nasty-te rms-of-use-we-may-not-provide-you-a-meaningful-data-experience/.

Lasar, Matthew, "MetroPCS: the open Internet on a budget?," Feb. 16, 2011, https://arstechnica.com/tech- policy/2011/02/metropcs-the-open-internet-on-a-budget/.

Newman, Jared, "AT&T Clarifies Data Throttling: Speed Limits Start at 3GB," Mar. 1, 2012, https://www.pcworld.com/article/251111/atandt_clarifies_data_throttling_speed_limits_start_at_3gb.html.

Langford, et al. "Cloud control: voluntary admission control for intranet traffic management," Information Systems and e-Business Management 10.3, Jan. 15, 2011, (2012): 295-308.

"Caching and Proxying Content with Windows Media Services 2008," Caching and Proxying Content with Windows Media Services 2008, N.p., Dec. 16, 2009, Web. Aug. 20, 2016.

http://www.mathcs.emory.edu/-cheung/Courses/558/Syllabus/, http://www.mathcs.emory.edu/-cheung/Courses/558/Syllabus/11-Fairness/LeakyBucket.html, Dec. 1, 2009, Web Aug. 22, 2016.

Microsoft TechNet, "What is QoS?", https://technet.microsoft.com/en-us/library/cc757120(v=ws.10).aspx, Mar. 28, 2003.

Shi, et al., "Greedy Fair Queueing: A Goal-Oriented Strategy for Fair Real-Time Packet Scheduling," Real-Time Systems Symposium, Dec. 5, 2003, RTSS 2003, 24th IEEE, IEEE, 2003.

Andelman et al., "Competitive queueing policies for QoS switches," Proceedings of the fourteenth annual ACM-SIAM symposium on Discrete algorithms, Jan. 12-14, 2003, Society for Industrial and Applied Mathematics, 2003.

Cisco Service Control Application for Broadband, "Service Control EasyApp—Time Shifting Traffic," [http://www.cisco.com/en/US/prod/collateral/ps7045/ps6129/ps6257/ps6135/white_paper_c11-591731.pdf], Apr. 2010.

Laoutaris et al., "Good Things Come to Those Who (Can) Wait or how to handle Delay Tolerant traffic and make peace on the Internet," In Proc. of ACM HotNets—VII, Oct. 6-7, 2008.

U.S. Office Action dated Oct. 14, 2014 in U.S. Appl. No. 13/672,743.
U.S. Office Action dated Apr. 30, 2015 in U.S. Appl. No. 13/672,743.
U.S. Office Action dated Mar. 8, 2016 in U.S. Appl. No. 13/672,743.
U.S. Office Action dated Aug. 25, 2016 in U.S. Appl. No. 13/672,743.
U.S. Office Action dated Feb. 15, 2017 in U.S. Appl. No. 13/672,743.
U.S. Office Action dated Sep. 28, 2017 in U.S. Appl. No. 13/672,743.
U.S. Advisory Action dated Feb. 6, 2018 in U.S. Appl. No. 13/672,743.
U.S. Notice of Allowance dated Feb. 23, 2018 in U.S. Appl. No. 13/672,743.

* cited by examiner

CONTROLLING NETWORK TRAFFIC USING ACCELERATION POLICIES

CROSS-REFERENCE TO RELATED APPLICATIONS

This application is a continuation of and claims priority to U.S. patent application Ser. No. 13/672,743, entitled "Controlling Network Traffic Using Acceleration Policies," filed Nov. 9, 2012, now U.S. Pat. No. 10,033,587, which is incorporated herein by reference in its entirety.

BACKGROUND

This application relates generally to network traffic control. More specifically, the disclosure provided herein relates to controlling network traffic using acceleration policies.

The prevalence of data communications across various types of networks has increased over the last several years. As a result, some communications networks may process millions of data requests per day. Some data requests may be associated with important and/or time-sensitive communications. Some other data requests may be associated with relatively unimportant communications that can be processed at almost any time without adversely affecting users of the network.

The growing demand and prevalence of data communications has resulted in an increased cost in providing data communication and also an increased difficulty in satisfying all of the requested data communications in a timely and efficient manner. Thus, some networks may operate on a first-in-first-out ("FIFO") model, wherein traffic is prioritized in order of receipt. Some networks also may prioritize data communications based upon known information. These and other models for satisfying communication requests may or may not respond to important communications in a timely manner.

SUMMARY

The present disclosure is directed to controlling network traffic using acceleration policies. According to various embodiments of the concepts and technologies disclosed herein, an acceleration application can be executed by a device for analyzing data requests, determining if the data communications requested by way of the request can be delayed, accelerated, or otherwise modified ("shifted") based upon policies and/or network operating conditions. In some embodiments, the acceleration application can be configured to access acceleration policies that can define how certain traffic is to be shifted. The acceleration application also can be configured to obtain and analyze network data to determine network operating conditions and to determine, based upon the determined conditions, if traffic is to be shifted based upon the network operating conditions.

In some embodiments, the acceleration application, or a device that executes the acceleration application, can access data that indicates if a user or other entity associated with a data request has opted-in or opted-out of data acceleration. If the user has opted-in to acceleration, the acceleration application can evaluate the data request to determine a type of data requested, expected resource needs, and the like. The acceleration application also can obtain and analyze network data and acceleration policies that can be understood by the acceleration application as defining, respectively, network planning policies and/or network operating conditions. Based upon the requested data communications, network planning policies, and/or network operating conditions, the acceleration application can determine if the requested data communications are to be shifted.

The acceleration application also can be configured to generate commands for various devices. The commands can instruct the devices regarding shifting the data communications and/or the delivery of the requested data communications. The acceleration application can provide the commands to the devices for implementation. In some embodiments, the acceleration application also can be configured to generate instructions for prompting a user or other entity to opt-in to data acceleration, for example via a user interface presented at a device.

According to one aspect of the concepts and technologies disclosed herein, a method is disclosed. The method can include detecting, at a server computer executing an acceleration application, a data request including a request for data communications and analyzing, at the server computer, the data request to determine if an entity associated with the data request has opted-in to data acceleration. In response to a determination that the entity has opted-in to the data acceleration, the method can include implementing an acceleration policy to shift delivery of the data communications.

In some embodiments, determining if the entity has opted-in can include accessing a data store and determining, based upon data stored at the data store, that the entity has opted-in to the data acceleration. In some embodiments, the method also can include generating instructions for prompting, at a device, for opt-in data indicating that an entity associated with the device opts-in to the data acceleration, obtaining the opt-in data from the device, and storing, at the data store, the opt-in data as the data. The method also can include analyzing network data indicating a network operating condition in response to the determination that the entity has opted-in to the data acceleration.

The method also can include obtaining the network data from a network reporting system. In some embodiments, the acceleration policy can include data indicating a network planning policy. The method can also include determining if the network planning policy suggests shifting delivery of the data communications and determining if the network operating condition suggests shifting delivery of the data communications. The method also can include generating a command for a data source. The command can include data instructing the data source to shift delivery of the data communications. In some embodiments, the method also can include generating a command for a data source, the command including data instructing the data source to allow the data communications without shifting delivery of the data communications.

According to another aspect of the concepts and technologies disclosed herein, a system is disclosed. The system can include a processor and a memory that stores computer-executable instructions that, when executed by the processor, cause the processor to perform operations that include detecting a data request including a request for data communications between a device and a data source, and analyzing the data request to determine if an entity associated with the data request has opted-in to data acceleration. In response to a determination that the entity has opted-in to the data acceleration, delivery of the data communications can be shifted.

In some embodiments, shifting delivery of the data communications can include delaying delivery of the data communications. In some other embodiments, shifting delivery of the data communications can include accelerating delivery of the data communications. In some embodiments, the system further can include a data store that stores opt-in data for two or more users, and determining if the entity has opted-in can include accessing the opt-in data and determining, based upon the opt-in data, that the entity has opted-in to the data acceleration. Execution of the computer-executable instructions by the processor can cause the processor to perform operations further including generating instructions for prompting at the device for the opt-in data, obtaining the opt-in data from the device, and storing, at the data store, the opt-in data.

In some embodiments, execution of the computer-executable instructions by the processor can cause the processor to perform operations further including in response to the determination that the entity has opted-in to the data acceleration, obtaining network data from a network reporting system. The network data can include data indicating a network operating condition associated with a network. The processor can analyze the network data to determine if the network operating condition suggests shifting delivery of the data communications and analyze a network planning policy to determine if the network planning policy suggests shifting the delivery of the data communications.

According to yet another aspect, a computer storage medium is disclosed. The computer storage medium can have computer-executable instructions stored thereon that, when executed by a processor, cause the processor to perform operations including detecting a data request including a request for data communications between a data source and a user device, determining if an entity associated with the data request has opted-in to data acceleration, in response to a determination that the entity has opted-in to the data acceleration, generating a command to shift delivery of the data communications, and in response to a determination that the entity has opted-out of the data acceleration, generating an instruction for delivering the data communications.

The computer-executable instructions can include computer-executable instructions that, when executed by the processor, cause the processor to determine that the entity has opted-in by accessing a data store and determining, based upon opt-in data stored at the data store, that the entity has opted-in to the data acceleration. In some embodiments, the computer-executable instructions can include computer-executable instructions that, when executed by the processor, cause the processor to perform operations further including generating instructions for prompting for the opt-in data, obtaining the opt-in data, and storing the opt-in data at the data store. In some embodiments, the computer-executable instructions can include computer-executable instructions that, when executed by the processor, cause the processor to perform operations further including in response to the determination that the entity has opted-in to the data acceleration, obtaining and analyzing network data indicating a network operating condition, determining if the network planning policy suggests shifting delivery of the data communications, and determining if the network operating condition suggests shifting delivery of the data communications. The computer-executable instructions also can include computer-executable instructions that, when executed by the processor, cause the processor to perform operations further including generating a command for instructing a data source to deliver the data communications.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to controlling network traffic using acceleration policies. According to various embodiments of the concepts and technologies disclosed herein, an acceleration application can be executed by a server computer or other device. The acceleration application can detect and analyze data requests and determine if data communications requested by the data request can be delayed, accelerated, or otherwise modified ("shifted") based upon policies and/or network operating conditions. The acceleration application also can be configured to access acceleration policies. The acceleration policies can define how certain traffic is to be shifted based upon a number of network planning policies embodied by the acceleration polices. The acceleration polices can, but do not necessarily, include algorithms for weighing various data and/or considerations. The acceleration application also can be configured to obtain and analyze network data to determine network operating conditions and determine, based upon the determined conditions, if traffic is to be shifted based upon the network operating conditions.

The acceleration application also can be configured to obtain and/or access data that indicates if a user or other entity associated with a data request has opted-in or opted-out of data acceleration. If the user has opted-in to acceleration, the acceleration application can evaluate the data request to determine a type of data requested, expected resource needs, and the like, and to analyze the network data and acceleration policies to determine if the requested data communications are to be shifted. The acceleration application also can generate commands for instructing one or more devices regarding shifting the data communications and/or the delivery of the requested data communications. The acceleration application can provide the commands to the devices for implementation.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
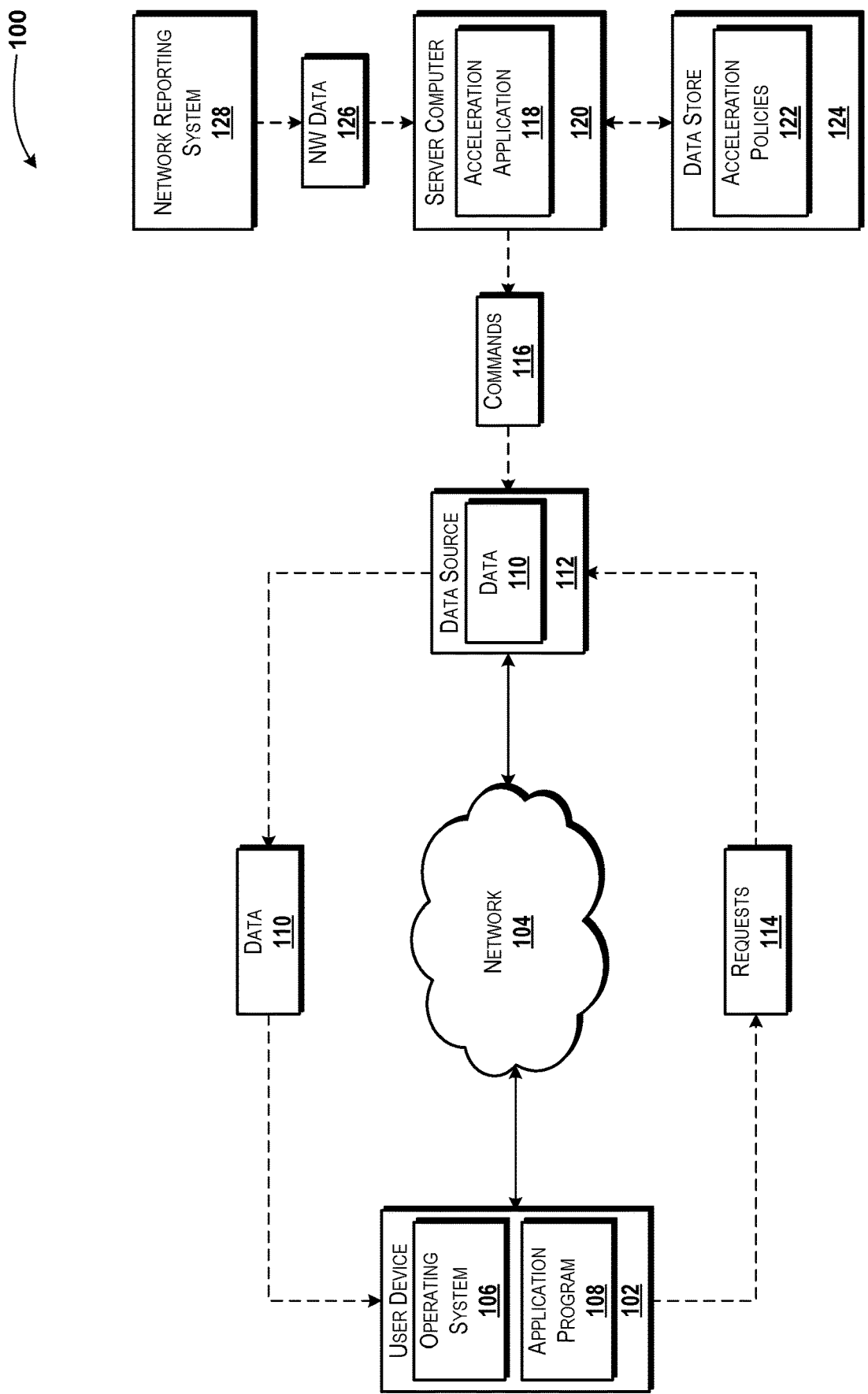
FIG. 1 is a system diagram illustrating an illustrative operating environment for the various embodiments disclosed herein.

Referring now to FIG. 1, aspects of an operating environment 100 for various embodiments of the concepts and technologies disclosed herein for controlling network traffic using acceleration policies will be described, according to an illustrative embodiment. The operating environment 100 shown in FIG. 1 includes a user device 102 operating in communication with and/or as part of a communications network ("network") 104. According to various embodiments, the functionality of the user device 102 may be provided by one or more server computers, desktop computers, mobile telephones, smartphones, tablet computers, laptop computers, set-top boxes, other computing systems, and the like. For purposes of describing the concepts and technologies disclosed herein, the user device 102 is described as a mobile telephone or a smartphone. It should be understood that this embodiment is illustrative, and should not be construed as being limiting in any way.

The user device 102 can execute an operating system 106 and one or more application programs 108. The operating system 106 is a computer program for controlling the operation of the user device 102. The application programs 108 are executable programs configured to execute on top of the operating system 106 to provide various functions. For example, the application programs 108 can include mapping/navigation applications, web browsers, media playback applications, voice and/or data communication applications, diagnostic applications, combinations thereof, or the like.

According to various embodiments, the application programs 108 can include natively executed applications and/or Web applications and/or other types of applications that use, obtain, and/or rely upon data 110 obtained from one or more data sources 112. For example, the application programs 108 can include a navigation application that obtains the data 110 from the data source 112, wherein the data 110 corresponds to map and/or traffic information, and the data source 112 can correspond to a navigation server. In another contemplated embodiment, the application program 108 can include a media playback application and the data 110 can correspond to multimedia content obtained from a data source 112, wherein the data source 112 can correspond to a media server. Because the data 110 can be obtained from almost any type of data source 112, it should be understood that these embodiments are illustrative, and should not be construed as being limiting in any way.

According to various embodiments, the user device 102 can generate one or more requests 114 for the data 110 and transmit the requests 114 to the data source 112. For example, the user device 102 can access a resource hosted or provided by the data source 112, thereby requesting access to the resource. As such, it should be understood that the user device 102 can request access to the data 110 in a number of ways such as, for example, accessing the data source 112 to read the data 110, requesting the data 110 explicitly by way of a request 114, and/or in other ways. In response to receiving the requests 114, the data source 112 can provide the requested data 110. In some embodiments, the data source 112 can be configured to execute an acceleration application and/or to communicate with an acceleration application or service that can analyze the requests 114 and issue commands 116 instructing the data source 112 to provide the data 110 and/or not to provide the data 110.

In the embodiment shown in FIG. 1, an acceleration application or service ("acceleration application") 118 is hosted by a computing device such as, for example, a server computer 120. In some embodiments, the acceleration application 118 and the server computer 120 can collectively provide functionality of an acceleration engine, though this is not necessarily the case. The acceleration application 118 can be configured to analyze the requests 114 received by the data source 112 and to issue the commands 116 for instructing the data source 112 regarding responding to the requests 114. In some embodiments, the acceleration application 118 can be configured to monitor communications occurring at the data source 112. In some other embodiments, the data source 112 and/or an application or service executing on or in association with the data source 112 or elsewhere can be configured to provide the functionality of the acceleration application 118 and/or to call or access the acceleration application 118. Thus, it should be understood that the acceleration application 118 can operate as an application on one or more devices and/or can operate as a service and can respond to calls from various entities or devices such as, for example, the data source 112.

The acceleration application 118 can be configured to manage traffic and/or to control traffic associated with a network 104 and/or a device in communication with the network 104 such as, for example, the user device 102. As used herein, the term "acceleration" can be used to refer to accelerating delivery of data, messages, and/or other types of communications; delaying delivery of data, messages, and/or other types of communications; and/or modifying a quality of service ("QoS"), priority, and/or other aspects of delivery of data, messages, and/or other types of communications. In some embodiments, as is explained in more detail below, the acceleration application 118 can be configured to use time shift functionality to shift data traffic and/or other communications on a small ("micro") scale, e.g., a number of microseconds or portions thereof, and/or on a large ("macro") scale, e.g., from a number of microseconds up to a number of hours or even days. Additionally, or alternatively, the acceleration application 118 can be configured to accelerate, delay, or otherwise shift ("shift") the traffic based upon expected or known network conditions and/or based upon determined network conditions at a particular time. These expected and/or determined conditions can be represented, respectively, by network planning policies and by data reflecting network conditions at a particular time, both of which are described in more detail below.

In some embodiments, though not shown in FIG. 1, the acceleration application 118 can be configured to expose one or more application programming interfaces ("APIs"), thereby enabling other devices, systems, or applications to call or access the functionality described herein for shifting traffic and/or other types of communications. As such, in some embodiments of the concepts and technologies disclosed herein, applications and/or services can be configured to provide data acceleration by accessing the acceleration application 118. In some embodiments, for example, applications can be configured to tag data requests and/or otherwise indicate in data requests that the data requested by the applications can be accelerated, e.g., by delaying or accelerating delivery of the data requested by the request 114. It should be understood that some embodiments of the concepts and technologies disclosed herein do not modify control tags to shift the traffic, and that this embodiment is illustrative and should not be construed as being limiting in any way. In some other embodiments, the acceleration application 118 can be configured to consider requests 114 and determine if the data requested by the requests 114 is subject to acceleration. These embodiments are described in more detail below.

As shown in FIG. 1, the acceleration application 118 can be configured to access one or more acceleration polices 122, which can be stored at a data store 124 that is accessible to the acceleration application 118. According to various embodiments, the functionality of the data store 124 can be provided by one or more real or virtual resources including, but not limited to, databases, server computers, desktop computers, mobile telephones, laptop computers, other computing systems, and the like. In the illustrated embodiments, the functionality of the data store 124 is provided by a database hosted on a server computer. It should be understood that this embodiment is illustrative, and should not be construed as being limiting in any way.

The acceleration application 118 can implement and/or apply the acceleration policies 122 to traffic and/or traffic or data requests such as the requests 114. The acceleration policies 122 can correspond, in some instances, to rules or algorithms for determining if traffic requested by way of the requests 114 is to be shifted. For example, the acceleration policies 122 can include rules for delaying or accelerating delivery of traffic based upon a time of day, week, month, or year at which a data request for the traffic is received; a type of traffic requested by the request 114; a sender or recipient of the data or other traffic requested by the request 114; other rules or considerations, or the like. In one contemplated embodiment, the acceleration polices 122 include one or more algorithms for evaluating a request 114 based upon a variety of considerations including, but not limited to, a geographic location of the requesting device or user; a relationship between a requesting device or user with the data source 112; pricing plans or options associated with the requesting device or user; time of day, week, month, or year; weather or other environmental conditions; emergency conditions; cost of providing the requested data or communications; combinations thereof; or the like. Because the acceleration policies 122 can include and/or can be based upon other rules, policies, and/or other considerations, it should be understood that these embodiments are illustrative, and should not be construed as being limiting in any way.

The acceleration policies 122 also can include algorithms for considering and/or evaluating network conditions in considering the requests 114. In particular, as shown in FIG. 1, the acceleration application 118 can be configured to obtain, receive, and/or request network data 126 that can be analyzed and/or interpreted by the acceleration application 118 and/or one or more algorithms included in the acceleration policies 122 to shift traffic requested by the requests 114. The network data 126 can be obtained from one or more network reporting systems 128. The network reporting systems 128 can include various device reporting mechanisms, network control systems, or the like.

According to various embodiments, the acceleration polices 122 can include one or more algorithms or policies for shifting traffic based upon network conditions. Thus, the acceleration policies 122 can include algorithms that weight or consider network or device congestion measurements; network or device analytics; network, device, and/or user policies; application settings or preferences; geographic or network locations; and/or the like. As such, it should be understood that the acceleration polices 122 disclosed herein can include one or more algorithms or other policies for shifting traffic based upon set or defined network planning polices and/or based upon dynamic network conditions.

According to various embodiments, an application or service requests data 110. For example, an application program 108 executing at the user device 102 can request data 110 from a data source 112 by way of a request 114, which the user device 102 can transmit to the data source 112. The data source 112 can be configured to call or access the acceleration application 118 and/or to provide the functionality described herein with respect to the acceleration application 118. As explained above, the acceleration application 118 can be called or accessed by way of one or more APIs exposed by the acceleration application 118 and/or a device executing the acceleration application 118 such as, for example, the server computer 120.

The acceleration application 118 can be configured to determine, based upon the request 114, if the data 110 requested by way of the request 114 is to be shifted. In some embodiments, as noted above, the request 114 can be tagged or otherwise can indicate that acceleration is allowed or requested. As such, the acceleration application 118 may or may not determine that the requested data 110 is to be shifted based upon the request 114 other than by identifying the tag or flag. In some embodiments, the acceleration application 118 can determines if a user, device, or other entity associated with the request 114 has opted-in to data acceleration. Thus, the acceleration application 118 can determine, based upon an identity associated with the request 114 and/or the request 114 itself that the data 110 requested by the request 114 to be shifted.

The acceleration application 118 can access acceleration policies 122 and/or network data 126 to determine that data 110 requested by way of the request 114 is or is not subject to acceleration. As explained above, the acceleration policies 122 can, among other things, describe network planning policies and/or preferences for shifting traffic. The network planning policies can, for example, be based upon expected network operating conditions such as capacity, bandwidth, congestion, or the like. The network planning policies also can define particular types of traffic that may or may not be delayed or accelerated at any time and/or at particular times. Thus, the network planning policies can be used to provide standards for considering requests 114 based upon contents of the request 114 and/or without considering actual network operating conditions at any particular time.

Additionally, as noted above, the acceleration policies 122 can include or define rules or policies for evaluating network operating conditions. For example, the acceleration policies 122 can include or define rules or policies for evaluating the network data 126. The network data 126 can be used to manage traffic shifting based upon actual conditions. The network data 126 can be used to shift data regardless of network planning policies. Thus, for example, if a network planning policy suggests delaying a data communication, the data requested by the request 114 may nonetheless be accelerated if an emergency condition or other consideration associated with the network data 126 suggests acceleration. It should be understood that this embodiment is illustrative, and should not be construed as being limiting in any way. The network data 126 can be used by the acceleration application 118 to shift delivery of data based upon actual network operating conditions in addition to, or instead of, the acceleration policies and/or associated network planning preferences described thereby.

The acceleration application 118 can issue one or more commands 116 to the data source 112 based upon the analysis and/or the implementation of the acceleration policies 122. The commands 116 can instruct the data source 112 to accelerate or delay delivery of the data 110 based upon the acceleration policies 122 and/or the network data 126. The commands 116 can, for example, prompt the data source 112 to accelerate delivery and/or to delay delivery of the data requested by the request 114. As such, it can be appreciated that the acceleration application 118 can be configured to control delivery of data and/or the timing of the delivery of data based upon policies and/or network operating conditions. It should be understood that these embodiments are illustrative, and should not be construed as being limiting in any way.

FIG. 1 illustrates one user device 102, one network 104, one data source 112, one server computer 120, one data store 124, and one network reporting system 128. It should be understood, however, that various implementations of the operating environment 100 include multiple user devices 102, multiple networks 104, multiple data sources 112, multiple server computers 120, multiple data stores 124, and/or multiple network reporting systems 128. As such, the illustrated embodiment should be understood as being illustrative, and should not be construed as being limiting in any way.

Figure 2:
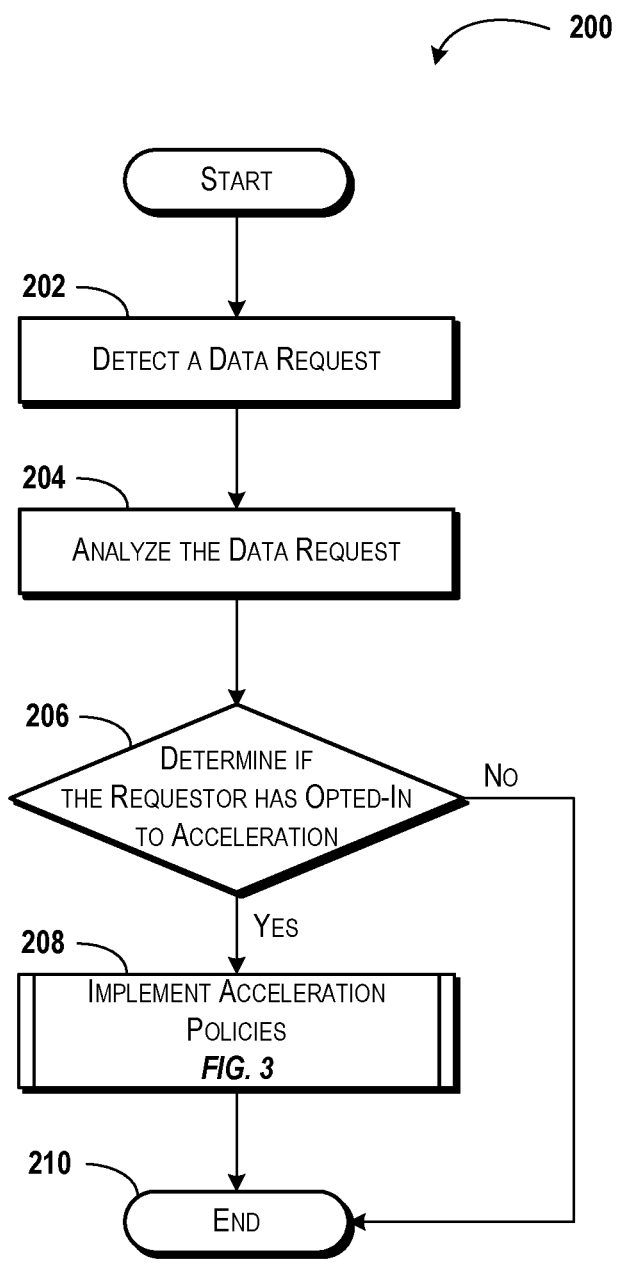
FIG. 2 is a flow diagram showing aspects of a method for controlling network traffic, according to an illustrative embodiment.

Turning now to FIG. 2, aspects of a method 200 for controlling network traffic will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or other device to perform one or more operations and/or causing the processor to direct other components of the computing system or device to perform one or more of the operations.

For purposes of illustrating and describing the concepts of the present disclosure, the methods disclosed herein are described as being performed by the server computer 120 via execution of one or more software modules such as, for example, the acceleration application 118. It should be understood that additional and/or alternative devices and/or network nodes can provide the functionality described herein via execution of one or more modules, applications, and/or other software including, but not limited to, the acceleration application 118. Thus, the illustrated embodiments are illustrative, and should not be viewed as being limiting in any way.

The method 200 begins at operation 202, wherein the server computer 120 detects a data request such as a request 114. As explained above in detail, detecting the data request in operation 202 can correspond to detecting that a device such as the user device 102 has requested data 110 from the data source 112; that the user device 102 has requested access to the data source 112; that the user device 102 has submitted data to the data source 112; and/or detecting other data communications between the user device 102 and the data source 112. It should be understood that that the data request detected in operation 202 can correspond to any type of request for data communications between one or more devices operating on or in communication with the network 104. As such, it should be understood that the above example embodiments are illustrative, and should not be construed as being limiting in any way.

From operation 202, the method 200 proceeds to operation 204, wherein the server computer 120 analyzes the data request received in operation 202. In particular, as will be explained in more detail below, the server computer 120 can analyze the data request to determine a type of data requested by way of the data request, a target of the data request and/or a source of the data requested by the data request, a bandwidth needed or expected to be needed to satisfy the data request, a time of day at which the data request is detected, a geographic location of the data requested in the data request, a geographic location of the requestor and/or the source of the data requested in the data request, and/or other data relating to the data requested and/or one or more devices that will be used to satisfy the data request. The server computer 120 also can access one or more network management devices such as subscriber databases, or the like, to evaluate one or more data plans associated with a device or user that generated the data request ("requestor"), an associated data usage, or the like. As such, the server computer 120 can evaluate the data communications requested as well as the parties involved in the data communications in operation 204.

From operation 204, the method 200 proceeds to operation 206, wherein the server computer 120 determines if the requestor has opted-in to acceleration. As noted above with reference to operation 204, the server computer 120 can access one or more network management devices such as subscriber databases, flow control devices, or the like. In various embodiments, these or other devices can store data indicating if the requestor has opted-in or opted-out of acceleration. The opting-in and/or opting-out of acceleration will be explained in more detail with reference to FIGS. 4-5B below.

As mentioned above, the functionality of the acceleration application 118 described herein can be provided by one or more applications executing at a device associated with the data request detected in operation 202. Furthermore, as noted above, the device associated with a data request such as the request 114 can be configured to tag, flag, or otherwise indicate in the request 114 that data acceleration is requested or available during providing the data 110 requested by the request 114. As such, it should be understood that the functionality described herein with reference to operations 204-206 can be replaced or obviated by detecting, in operation 202, a request 114 that includes a flag or tag for allowing acceleration.

If the server computer 120 determines, in operation 206, that the requestor has opted-in to acceleration, then the method 200 proceeds to operation 208. At operation 208, the server computer 120 implements the acceleration policies 122 with respect to the data request received in operation 202. Additional details of implementing the acceleration policies 122 are illustrated and described below in more detail, particularly with reference to FIG. 3. Briefly, the server computer 120 can obtain and analyze network data 126 and the acceleration policies 122 to determine if the data communications or other traffic requested by way of the data request detected in operation 202 is to be time shifted to accommodate network planning policies and/or due to operating conditions associated with the network 104. Based upon these and/or other determinations, the server computer 120 can allow the traffic without time shifting and/or time-shift the traffic based upon the determinations.

If the server computer 120 determines, in operation 206, that the request has opted-out of acceleration, then the method 200 can proceed to operation 210. Similarly, the method 200 can proceed to operation 210 from operation 208. The method 200 ends at operation 210. As such, it can be appreciated that data requests detected in operation 202 that are received from devices that have opted-out of acceleration can be processed without using the functionality described herein for controlling network traffic using acceleration policies.

Figure 3:
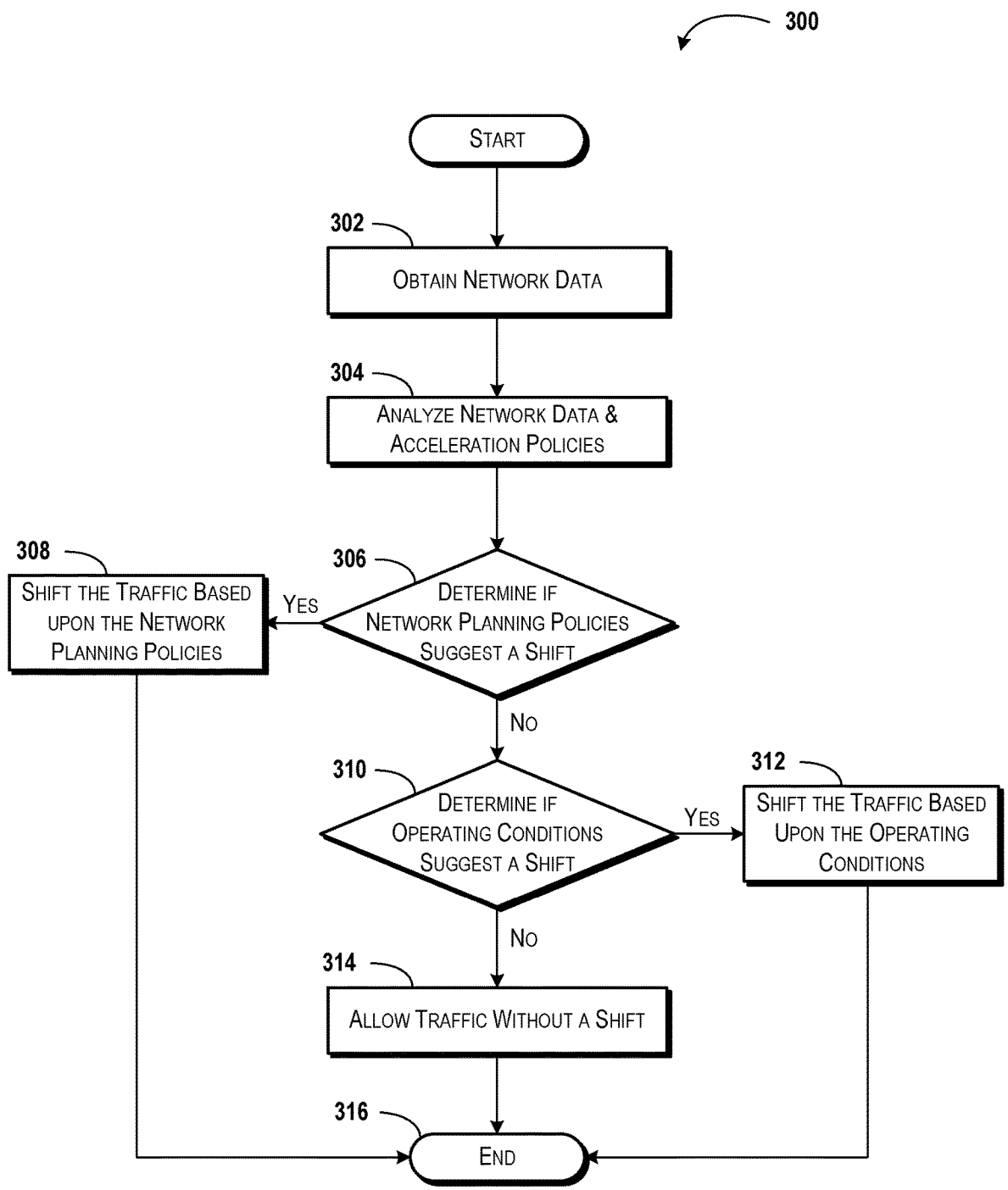
FIG. 3 is a flow diagram showing aspects of a method for implementing acceleration policies, according to another illustrative embodiment.

Turning now to FIG. 3, aspects of a method 300 for implementing acceleration policies 122 will be described in detail, according to an illustrative embodiment. As explained above with reference to FIG. 2, the operations described herein with reference to FIG. 3 can be, but are not necessarily, executed by the server computer 120 at operation 208 of the method 200 described above. Because the operations described herein can be performed at additional or alternative times, it should be understood that this embodiment is illustrative, and should not be construed as being limiting in any way.

The method 300 begins at operation 302, wherein the server computer 120 obtains network data such as the network data 126. In some embodiments, one or more reporting mechanisms such as the network reporting systems 128 can submit network data such as the network data 126 to the server computer 120. In some other embodiments, the server computer 120 can request network data such as the network data 126 from the one or more reporting mechanisms and receive the network data 126 in response to the request. As explained in more detail above with reference to FIG. 1, the network data 126 can include, but is not limited to, data indicating network bandwidth, network congestion, network and/or device power requirements, emergencies and/or emergency conditions, location information such as data indicating geographic locations of users or devices, or the like. Because other types of network data can be obtained in operation 302, it should be understood that these embodiments are illustrative, and should not be construed as being limiting in any way.

From operation 302, the method 300 proceeds to operation 304, wherein the server computer 120 analyzes the network data 126 and the acceleration policies 122. According to various embodiments, the server computer 120 can analyze the network data 126 obtained in operation 302 to evaluate and/or determine operating conditions of the network 104. Additionally, or alternatively, the server computer 120 can analyze the acceleration policies 122 to determine if any network planning policies or other considerations relate to the traffic associated with the data request received in operation 202 of the method 200.

From operation 304, the method 300 proceeds to operation 306, wherein the server computer 120 determines if one or more network planning policies suggest a shift in the traffic associated with the data request received in operation 202 of the method 200. As mentioned above, a "shift" in traffic can include, but is not limited to, a delay in delivery of data or other communications, acceleration of delivery of the data or other communications, modification of a QoS of the communications, and/or the like. The network planning policies, as described above, can relate to guidelines or policies for delaying or accelerating delivery of data.

The network planning policies can, for example, define particular types of data traffic that are to be delayed or accelerated and/or for which various other aspects of data delivery are to be modified (e.g., QoS, cost, or the like). In some embodiments, for example, the network planning policies can define emergency calls as communications the delivery of which will be accelerated, regardless of other considerations. Similarly, the network planning policies can define video or media downloads as communications the delivery of which is to be delayed unless such a delay is determined to be unnecessary at a particular time. The network planning policies can define rules for shifting traffic based upon user or device identification information; types of data or data requests; locations of users or data sources 112; partnership agreements; time of day, week, month, or year; and/or other considerations as described herein. As such, the above examples are merely illustrative and should not be construed as being limiting in any way.

If the server computer 120 determines, in operation 306, that a network planning policy and/or combination of two or more network planning policies suggest a shift in the traffic, the method 300 can proceed to operation 308. In operation 308, the server computer 120 can shift the traffic based upon the one or more network planning policies. According to various embodiments, the shifting of the traffic based upon the one or more network planning polices can include applying an algorithm to the request 114 to generate a command 116 for delaying the traffic or accelerating the traffic as described herein. The command 116 can specify a time span for which the traffic is to be delayed, a rate at which delivery of the traffic is to be accelerated, or the like. The command 116 also can specify one or more changes to other aspects of the data delivery such as channel selection, QoS, priority, or the like. It should be understood that these embodiments are illustrative, and should not be construed as being limiting in any way.

If the server computer 120 determines, in operation 306, that one or more network planning policies do not suggest a shift in the traffic, the method 300 proceeds to operation 310.

In operation 310, the server computer 120 can determine if one or more operating conditions of the network 104 suggest a shift in the traffic or other communications requested by the request 114. According to various embodiments, the server computer 120 can execute the acceleration application 118 to analyze the network data 126 described herein. Thus, the server computer 120 can analyze the network data 126 to determine various network operating conditions associated with the network 104 such as, for example, a cost of delivering the requested data in terms of messaging, storage costs, power costs, computing costs, processing costs, bandwidth costs, or the like; a response time for responding to the request 114; a load on various network elements to respond to the request 114; other pending traffic requests and their relative priority compared to the data requested by the request 114; combinations thereof; or the like.

If the server computer 120 determines, in operation 310, that a network operating condition and/or combination of two or more network operating conditions suggest a shift in the traffic, the method 300 can proceed to operation 312. In operation 312, the server computer 120 can shift the traffic based upon the one or more network operating conditions. According to various embodiments, the shifting of the traffic based upon the one or more network operating conditions can include applying an algorithm to the request 114 to generate a command 116 for delaying the traffic or accelerating the traffic as described herein. As noted above, the command 116 can specify a time span or window for which the traffic is to be delayed or accelerated, a direction in which the traffic is to be shifted (e.g., whether the traffic is to be accelerated or delayed), a rate at which delivery of the traffic is to be accelerated, or the like. As such, the command 116 can specify a direction and magnitude of a shift, if desired. The command 116 also can specify one or more changes to QoS, priority, and/or other aspects of the data delivery. It should be understood that these embodiments are illustrative, and should not be construed as being limiting in any way.

If the server computer 120 determines, in operation 310, that one or more network operating conditions do not suggest a shift in the traffic, the method 300 proceeds to operation 314. In operation 314, the server computer 120 can issue a command 116 for allowing the traffic without a shift. Thus, operation 314 can correspond to the acceleration application 118 determining that the traffic is not to be shifted for a network planning policy and/or a network operating condition. As such, execution of the operation 314 can cause the acceleration application 118 and/or a device executing the acceleration application 118 to issue one or more commands 116 for implementing or allowing the data requested by way of the data request detected in operation 202 without any shifting. Similarly, execution of the operation 314 can cause the acceleration application 118 and/or a device executing the acceleration application 118 to not issue any commands 116 described herein.

From operation 312, the method 300 proceeds to operation 314. The method 300 ends at operation 314.

Figure 4:
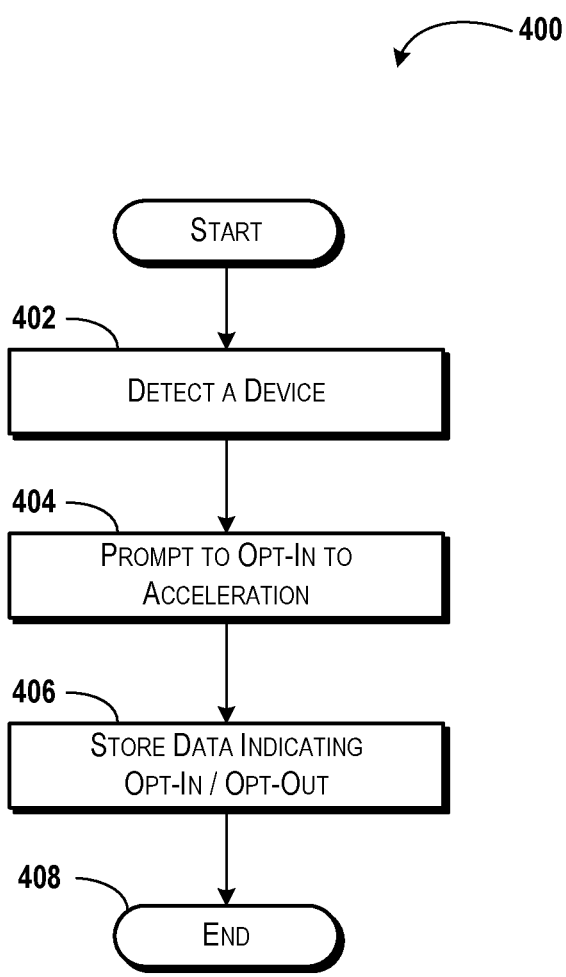
FIG. 4 is a flow diagram showing aspects of a method for registering devices for traffic control, according to another illustrative embodiment.

Turning now to FIG. 4, aspects of a method 400 for registering devices for acceleration will be described in detail, according to an illustrative embodiment. The method 400 begins at operation 402, wherein the server computer 120 detects a device such as, for example, the user device 102. In some embodiments, the functionality described herein with reference to operation 402 can be executed by the server computer 120 during registration or setup of a device such as the user device 102. In some other embodiments, the functionality of operation 402 can be executed by the server computer 120 at other times or situations such as, for example, the server computer 120 or other device associated with the acceleration application 118 prompting various devices for opting-in or opting-out of the acceleration service functionality described herein.

As explained above, the functionality of the acceleration application 118 can be provided by one or more applications executing at the user device 102. As such, operation 402 can correspond, in some embodiments, to the user device 102 detecting registration or setup of the user device 102. Because the other operations of the method 400 described herein can occur at almost any time, it should be understood that these embodiments are illustrative, and should not be construed as being limiting in any way.

From operation 402, the method 400 proceeds to operation 404, wherein the server computer 120 prompts the device detected in operation 402 to opt-in or opt-out of acceleration. According to some embodiments, the server computer 120 can send instructions or commands to the device detected in operation 402 to prompt a user or other entity to opt-in or opt-out of data acceleration. It should be understood that by opting-in or opting-out of "data acceleration," the user can opt-in or opt-out of the data acceleration service disclosed herein for shifting traffic including, but not limited to, accelerating delivery of the traffic, delaying delivery of the traffic, and/or otherwise changing a time at which traffic is delivered. The instructions or commands can prompt the device, e.g., a user device 102, to present a form to a user or other entity to obtain data relating to the opt-in or opt-out decision. An example of a user interface for prompting a user to opt-in or opt-out of data acceleration is illustrated and described below with reference to FIG. 5A.

In some embodiments, wherein the functionality of the acceleration application 118 is provided by an application executing at the user device 102, the prompting for an opt-in or opt-out decision can be completed at the user device 102. As such, it should be understood that the server computer 120 may or may not provide any functionality described herein with respect to operation 404.

From operation 404, the method 400 proceeds to operation 406, wherein the server computer 120 stores data indicating whether the device detected in operation 402 has opted-in or opted-out of acceleration. According to various embodiments, the server computer 120 can create and/or store one or more entries in a database or datastore such as the data store 124. The one or more entries can identify the device detected in operation 402 and/or a user or other entity associated with the device detected in 402. The one or more entries also can indicate if the device or user associated with the device has opted-in or opted-out of acceleration. The data indicating if the user or user device has opted-in or opted-out of acceleration can be stored in a user or subscriber database, in a memory or other data storage location associated with the acceleration application 118, and/or elsewhere.

In some embodiments, wherein an application executing at a device provides the functionality described herein with respect to FIG. 4, the data indicating an opt-in or opt-out decision can be stored at the device. In one contemplated embodiment, for example, data indicating the opt-in or opt-out decision can be stored as a device, application, or user setting or other type of data. The data also can be shared with one or more devices or systems in communication with the device, if desired, for example to modify a user's data plan or billing policies, for example. These examples are illustrative and should not be construed as being limiting in any way.

From operation 406, the method 400 proceeds to operation 408. The method 400 ends at operation 408.

Figure 5A:
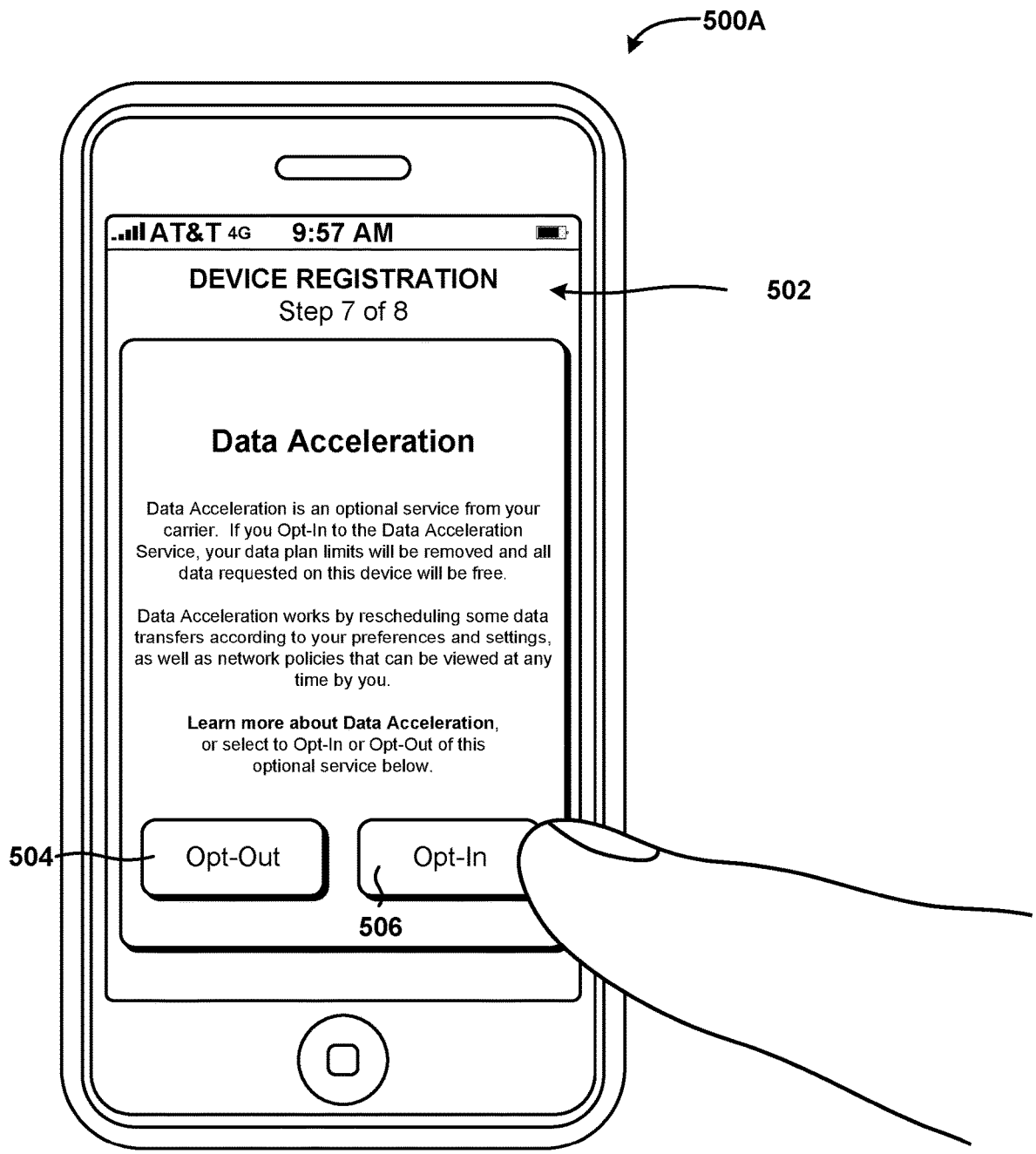
FIGS. 5A-5B are user interface ("UI") diagrams showing aspects of UIs for controlling network traffic using acceleration policies, according to some illustrative embodiments.
Figure 5B:
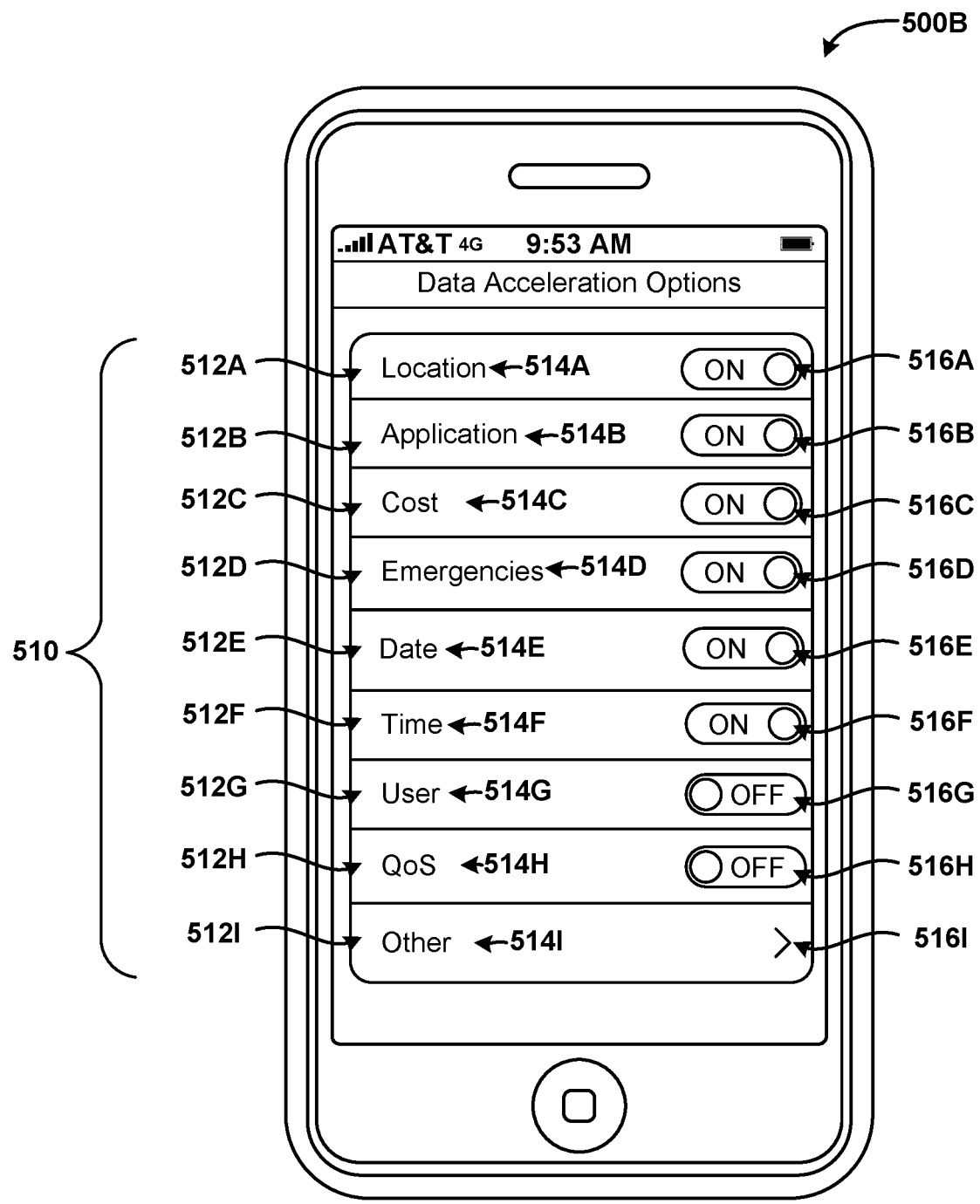

Turning now to FIGS. 5A-5B, UI diagrams showing various aspects of the concepts and technologies disclosed herein for controlling network traffic using acceleration policies will be described according to various illustrative embodiments. FIG. 5A shows an illustrative screen display 500A generated by a device such as the user device 102. According to various embodiments, the user device 102 can generate the screen display 500A and/or other screen displays in conjunction with and/or based upon data received from the acceleration application 118 described herein. As noted above, the functionality associated with the acceleration application 118 can be provided by a device remote from the user device 102 such as, for example, the server computer 120 and/or via one or more application programs 108 executing at the user device 102. It should be appreciated that the UI diagram illustrated in FIG. 5A is illustrative of one contemplated embodiment, and therefore should not be construed as being limiting in any way.

Although not shown in FIG. 5A, the screen display 500A can include various menus and/or menu options such as options for advancing to a next screen, returning to a previous screen, exiting registration of the user device 102, and/or other options. While the example embodiment of the screen display 500A illustrated in FIG. 5A is illustrated as being presented during a device registration or setup operation, it should be understood that the screen display 500A and/or other screen displays can be provided at almost any time during operation of the user device 102. Because the screen display 500A can be displayed at other times, it should be understood that this embodiment is illustrative, and should not be construed as being limiting in any way.

In FIG. 5A, the user device 102 is illustrated as displaying an opt-in or opt-out screen for data acceleration as disclosed herein. It can be appreciated from the description of FIG. 4 above that the screen display 500A illustrated in FIG. 5A can be, but is not necessarily, used to prompt a user to opt-in to data acceleration as described with reference to operation 404 of the method 400 illustrated in FIG. 4. The screen display 500A can include a data acceleration opt-in screen 502 that explains data acceleration, offers one or more incentives or benefits in return for opting-in to data acceleration (e.g., removing data plan limits, making all data requested on the device free), offers one or more links to additional information relating to data acceleration, provides a UI control 504 for opting-out of data acceleration, and/or provides a UI control 506 for opting-in to data acceleration. Thus, a user or other entity can, by way of interacting with the data acceleration opt-in screen 502 opt-in to data acceleration or opt-out of data acceleration.

Selection of the UI control 504 can cause the user device 102 to transfer or store data indicating that the user device 102 is opted-out of data acceleration while selection of the UI control 506 can cause the user device 102 to transfer or store data indicating that the user device 102 is opted-in to data acceleration. Because additional or alternative UI controls can be included in the screen display 500A, and/or because additional or alternative actions can be taken in response to selection of the UI controls included in the screen display 500A, it should be understood that these embodiments are illustrative, and should not be construed as being limiting in any way.

Referring now to FIG. 5B, a UI diagram showing additional aspects of the concepts and technologies disclosed herein for controlling network traffic using acceleration policies are described in detail. In particular, FIG. 5B shows a screen display 500B generated by a device such as the user device 102. In some embodiments, the screen display 500B can be generated by the user device 102 in response to detecting a tap, touch, gesture, keystroke, voice command, or other input for modifying one or more settings, preferences, or configurations associated with the acceleration application 118 and/or application programs 108 that access or interact with the acceleration application 118. Additionally, or alternatively, the screen display 500B can be displayed in response to detecting input for viewing or modifying one or more of the acceleration policies 122 described herein. Because the screen display 500B can be presented at other times, it should be understood that this embodiment is illustrative, and should not be construed as being limiting in any way.

The screen display 500B can include a data acceleration policy list 510. The data acceleration policy list 510 can include a number of rows 512A-I (hereinafter collectively and/or generically referred to as "rows 512"). The rows 512 can correspond to various applications, activities, operating conditions, and/or other types of constraints that can be used to trigger or restrict data acceleration functionality of the acceleration application 118 described herein. The rows 512 shown in FIG. 5B illustrate only some contemplated examples of constraints that can be used to trigger or restrict data acceleration and therefore should not be construed as being limiting in any way.

One or more of the rows 512 can include an indication 514A-I (hereinafter collectively and/or generically referred to as "indications 514") of a particular constraint and/or other type of information to which the row 512 corresponds. The rows 512 also can include one or more UI controls 516A-I (hereinafter collectively and/or generically referred to as "UI controls 516"). The UI controls 516 can be used to select and/or deselect various applications, operating conditions, other information, and/or other constraints that can be used to trigger or restrict access to the acceleration application 118. The UI controls 516 also can be selected to allow access to additional options or menus associated with the respective rows 512. The UI control 516I, for example, can be selected by a user or other entity to access additional or alternative functionality such as a submenu or other display associated with various other constraints that may be used to control policies or other constraints associated with the acceleration application 118.

It can be appreciated with reference to FIG. 5B that a user or other entity can tailor, via interactions with the screen display 500B, what applications, network conditions, costs, operating conditions, and/or other constraints are to be used by the user device 102 and/or the acceleration application 118 executing remotely, for example at the server computer 120, to request or refuse data acceleration. In the example shown in FIG. 5B, a user has selected to enable or turn on rows 512A-F. As such, the user device 102 can communicate to the acceleration application 118 operating at the user device 102 and/or remotely from the user device 102 to use location, application settings, communications costs, detected emergencies or emergency conditions, time, and date information to trigger or restrict the data acceleration. It should be understood that this embodiment is illustrative, and should not be construed as being limiting in any way.

According to various embodiments, the screen display 500B can be presented in response to a user or other entity accessing preferences or settings associated with the acceleration application 118. As such, it should be understood that the screen display 500B can be presented at almost any time. In some embodiments, the rows 512 can include rows 512 for each application program 108 capable of data acceleration that is installed at and/or accessible by the user device 102. As explained above, the application programs 108 can be configured to access one or more APIs associated with the acceleration application 118, if desired. As such, the data acceleration policy list 510 illustrated in FIG. 5B can include any number of rows 512 and/or various levels of detail, since some application programs 108 may include multiple settings relating to data acceleration. As such, it should be understood that this embodiment is illustrative, and should not be construed as being limiting in any way.

Figure 6:
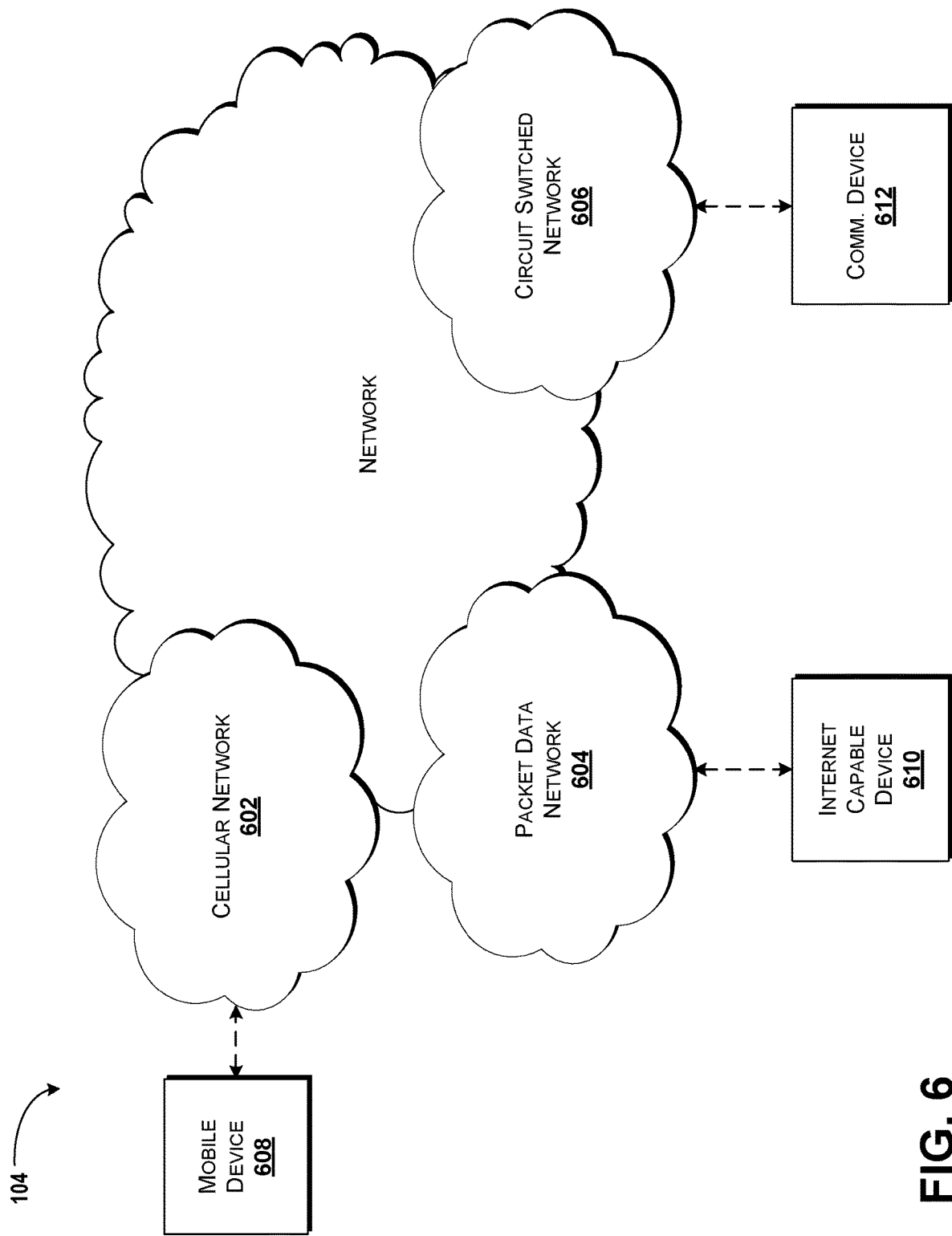
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
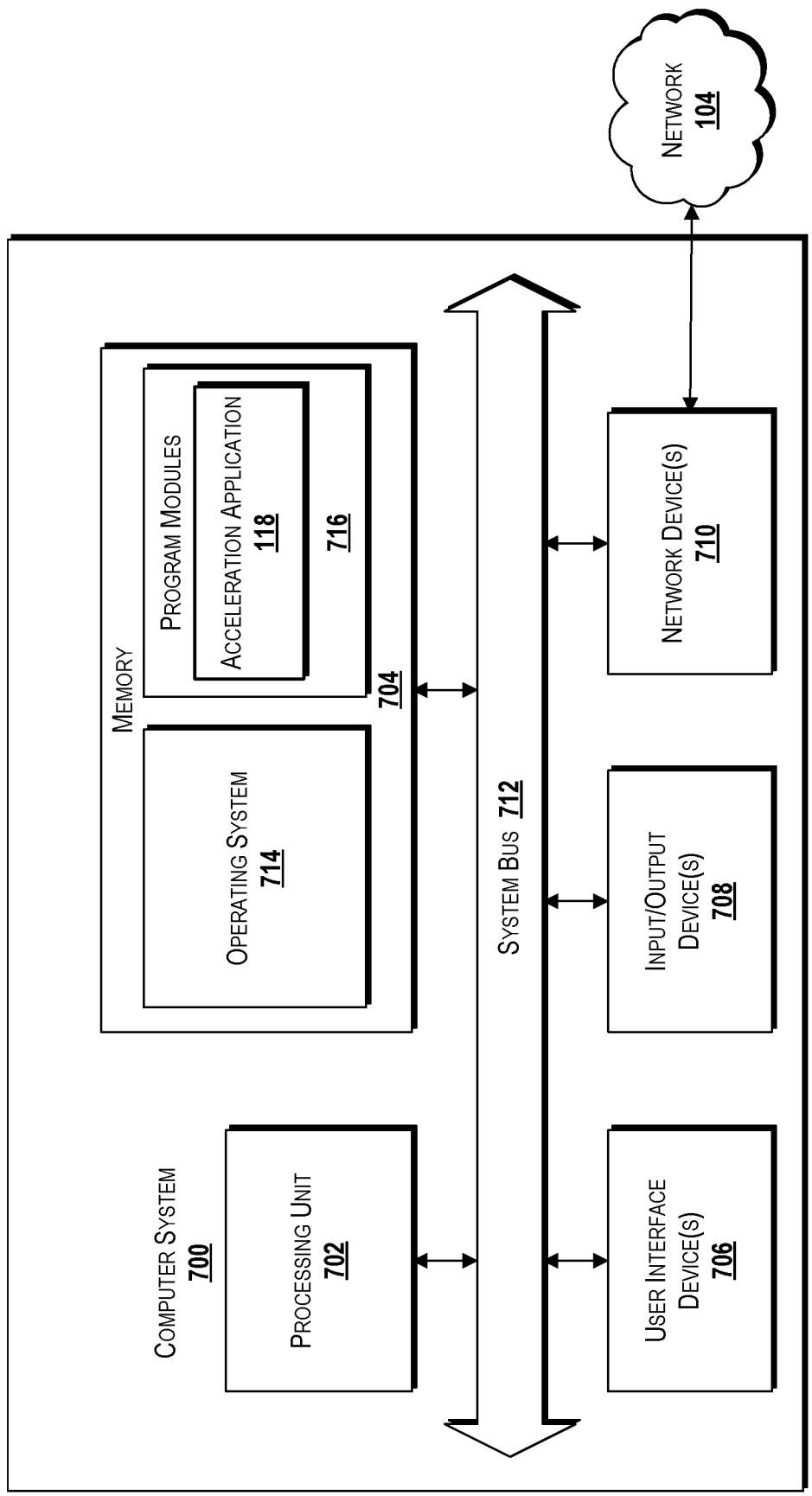
FIG. 7 is a block diagram illustrating an example computer system for controlling network traffic using acceleration policies, according to some illustrative embodiments.

FIG. 7 is a block diagram illustrating a computer system 700 configured to provide the functionality described herein for a verification service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the acceleration application 118. This and/or other programs can be embodied in computer-readable media containing instructions that, when executed by the processing unit 702, perform one or more of the methods 200, 300, 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the acceleration policies 122, the network data 126, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof, does not include waves, signals, and/or other transitory and/or intangible communication media, per se.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for controlling network traffic using acceleration policies have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   detecting, at a server computer comprising a processor, a request for data from a data source, wherein the request is made by a requestor that communicates with the data source;
   identifying, by the server computer, a data plan associated with the requestor, the data plan comprising a limit on use of a network by the requestor;
   determining, by the server computer, if the requestor has opted-in to use data acceleration for delivery of the data; and
   in response to determining that the requestor has opted-in to use the data acceleration,
      modifying, by the server computer, the limit of the data plan,
      determining, by the server computer, a direction and magnitude of a time shift that is to be applied to the delivery of the data based on a network operating condition and a policy, wherein the direction of the time shift comprises a delivery delay or a delivery acceleration,
      in response to a determination that the time shift comprises the delivery delay, instructing, by the server computer, the data source to delay the delivery of the data by the magnitude of the time shift, and
      in response to a determination that the time shift comprises the delivery acceleration, instructing, by the server computer, the data source to accelerate the delivery of the data by the magnitude of the time shift.

2. The method of claim 1, further comprising:
modifying, based on the network operating condition and the policy, a quality of service of data communications used to deliver the data.

3. The method of claim 1, wherein the request for the data comprises a control tag that indicates that the time shift can be applied to the delivery of the data, and wherein the control tag is added to the request for the data by the requestor.

4. The method of claim 1, further comprising:
determining, based on preferences associated with the requestor, whether the delivery of the data can be delayed and whether the delivery of the data can be accelerated.

5. The method of claim 1, further comprising:
determining a time span for which modification of the delivery of the data is to be applied by the data source.

6. The method of claim 1, wherein in response to determining that the requestor has opted-in to use the data acceleration, a data plan limit is removed.

7. The method of claim 1, further comprising:
determining, based on preferences associated with the requestor, that the delivery of the data is to be modified, wherein the preferences define restrictions on acceleration based on a geographic location at which the request for the data is generated.

8. A system comprising:
a server computer comprising a processor; and
a memory that stores computer-executable instructions that, when executed by the processor, cause the processor to perform operations comprising
detecting a request for data from a data source, wherein the request is made by a requestor that communicates with the data source,
identifying a data plan associated with the requestor, the data plan comprising a limit on use of a network by the requestor,
determining if the requestor has opted-in to use data acceleration for delivery of the data, and
in response to determining that the requestor has opted-in to use the data acceleration
modifying the limit of the data plan,
determining a direction and magnitude of a time shift that is to be applied to the delivery of the data based on a network operating condition and a policy, wherein the direction of the time shift comprises a delivery delay or a delivery acceleration,
in response to a determination that the time shift comprises the delivery delay, instructing the data source to delay the delivery of the data by the magnitude of the time shift, and
in response to a determination that the time shift comprises the delivery acceleration, instructing the data source to accelerate the delivery of the data by the magnitude of the time shift.

9. The system of claim 8, wherein the computer-executable instructions, when executed by the processor, cause the processor to perform operations further comprising:
modifying, based on the network operating condition and the policy, a quality of service of data communications used to deliver the data.

10. The system of claim 8, wherein the request for the data comprises a control tag that indicates that the time shift can be applied to the delivery of the data, and wherein the control tag is added to the request for the data by the requestor.

11. The system of claim 8, wherein the computer-executable instructions, when executed by the processor, cause the processor to perform operations further comprising:
determining, based on preferences associated with the requestor, whether the delivery of the data can be delayed and whether the delivery of the data can be accelerated.

12. The system of claim 8, wherein the computer-executable instructions, when executed by the processor, cause the processor to perform operations further comprising:
determining a time span for which modification of the delivery of the data is to be applied by the data source.

13. The system of claim 8, wherein in response to determining that the requestor has opted-in to use the data acceleration, a data plan limit is removed.

14. The system of claim 8, wherein the computer-executable instructions, when executed by the processor, cause the processor to perform operations further comprising:
determining, based on preferences associated with the requestor, that the delivery of the data is to be modified, wherein the preferences define restrictions on acceleration based on a geographic location at which the request for the data is generated.

15. A computer storage medium having computer-executable instructions stored thereon that, when executed by a processor, cause the processor to perform operations comprising:
detecting a request for data from a data source, wherein the request is made by a requestor that communicates with the data source;
identifying a data plan associated with the requestor, the data plan comprising a limit on use of a network by the requestor;
determining if the requestor has opted-in to use data acceleration for delivery of the data; and
in response to determining that the requestor has opted-in to use the data acceleration,
modifying the limit of the data plan,
determining a direction and magnitude of a time shift that is to be applied to the delivery of the data based on a network operating condition and a policy, wherein the direction of the time shift comprises a delivery delay or a delivery acceleration,
in response to a determination that the time shift comprises the delivery delay, instructing the data source to delay the delivery of the data by the magnitude of the time shift, and
in response to a determination that the time shift comprises the delivery acceleration, instructing the data source to accelerate the delivery of the data by the the magnitude of the time shift.

16. The computer storage medium of claim 15, wherein the computer-executable instructions, when executed by the processor, cause the processor to perform operations further comprising:
modifying, based on the network operating condition and the policy, a quality of service of data communications used to deliver the data.

17. The computer storage medium of claim 15, wherein the request for the data comprises a control tag that indicates that the time shift can be applied to the delivery of the data, and wherein the control tag is added to the request for the data by the requestor.

18. The computer storage medium of claim 15, wherein the computer-executable instructions, when executed by the processor, cause the processor to perform operations further comprising:

determining a time span for which modification of the delivery of the data is to be applied by the data source.

19. The computer storage medium of claim 15, wherein in response to determining that the requestor has opted-in to use the data acceleration, a data plan limit is removed.

20. The computer storage medium of claim 15, wherein the computer-executable instructions, when executed by the processor, cause the processor to perform operations further comprising:

determining, based on preferences associated with the requestor, that the delivery of the data is to be modified, wherein the preferences define restrictions on acceleration based on a geographic location at which the request for the data is generated.

* * * * *